(12) United States Patent
Kato (10) Patent No.: US 6,186,014 B1
(45) Date of Patent: Feb. 13, 2001

(54) CAM MECHANISM

(75) Inventor: Heizaburo Kato, Shizuoka (JP)

(73) Assignee: Sankyo Manufacturing Co., Ltd., Tokyo (JP)

(*) Notice: Under 35 U.S.C. 154(b), the term of this patent shall be extended for 0 days.

(21) Appl. No.: 08/964,697

(22) Filed: Nov. 6, 1997

(30) Foreign Application Priority Data

Nov. 11, 1996 (JP) .................................................... 8-298955

(51) Int. Cl.$^7$ .............................. F16H 37/16; F16D 3/06
(52) U.S. Cl. ................................................ 74/53; 74/84 R
(58) Field of Search ................................ 74/53, 54, 84 R, 74/569

(56) References Cited

U.S. PATENT DOCUMENTS

| | | | |
|---|---|---|---|
| 815,979 | * 3/1906 | Richards | 74/84 R |
| 3,854,343 | * 12/1974 | May | 74/567 X |
| 4,633,111 | * 12/1986 | Gonzi | 74/57 X |
| 4,955,243 | * 9/1990 | Kato et al. | 74/569 X |

FOREIGN PATENT DOCUMENTS 7-52444  11/1995 (JP) .

* cited by examiner

*Primary Examiner*—David Fenstermacher
(74) *Attorney, Agent, or Firm*—Morrison & Foerster LLP

(57) ABSTRACT

A cam powered mechanism which uses two cam forms, a swing arm, and turret to drive an output shaft with a compound radial and axial movement. An arrangement in which a cam follower is positioned opposite each planar surface of the rectangular spline connecting the turret and output shaft acts to increase turret strength and reduces the size of the mechanism.

10 Claims, 11 Drawing Sheets

CAM MECHANISM

BACKGROUND OF THE INVENTION

1. Field of the Invention

The invention relates to a cam driven mechanism in which the rotating torque applied to a roller gear cam is converted to the oscillating rotational movement of a turret and an output shaft by means of a cam follower.

2. Description of the Related Art

The type of cam mechanism mentioned above, which has been proposed by Japanese utility model publication 7-52444 (Int.Cl.F16H 37/16), operates by means wherein the rotating movement input to a cam mechanism is converted into a oscillating rotational movement of an output shaft on the radial axis, and also a reciprocating movement of the output shaft in the axial direction. This type of mechanism is commonly applied to the tool changing mechanisms of metal processing machines with the purpose of obtaining a fast and precise tool change indexing action.

The aforesaid cam mechanism incorporates a roller gear cam fixedly attached to the input shaft, tapered ribs formed on the cam's periphery, and a cam channel formed on one of the cam's lateral surfaces. A roller cam follower, which is supported by a turret piece, rides between the aforesaid tapered ribs on the cam's periphery, and a swing arm rides in the aforesaid cam channel on the cam's lateral surface by means of a cam follower pin. An output shaft is installed through the turret's center by means of a sliding spline joint which fixedly connects the shaft to the turret in the radial direction, but allows free axial movement of the shaft through the turret piece in the axial direction. The end of the aforesaid swing arm is installed to the output shaft.

As a result of this configuration, the rotating movement of the input shaft is converted to an oscillating rotational movement of the output shaft by means of the aforesaid turret, and further converted to a reciprocating movement of the output shaft in the axial direction by means of the aforesaid swing arm.

Figure 11:
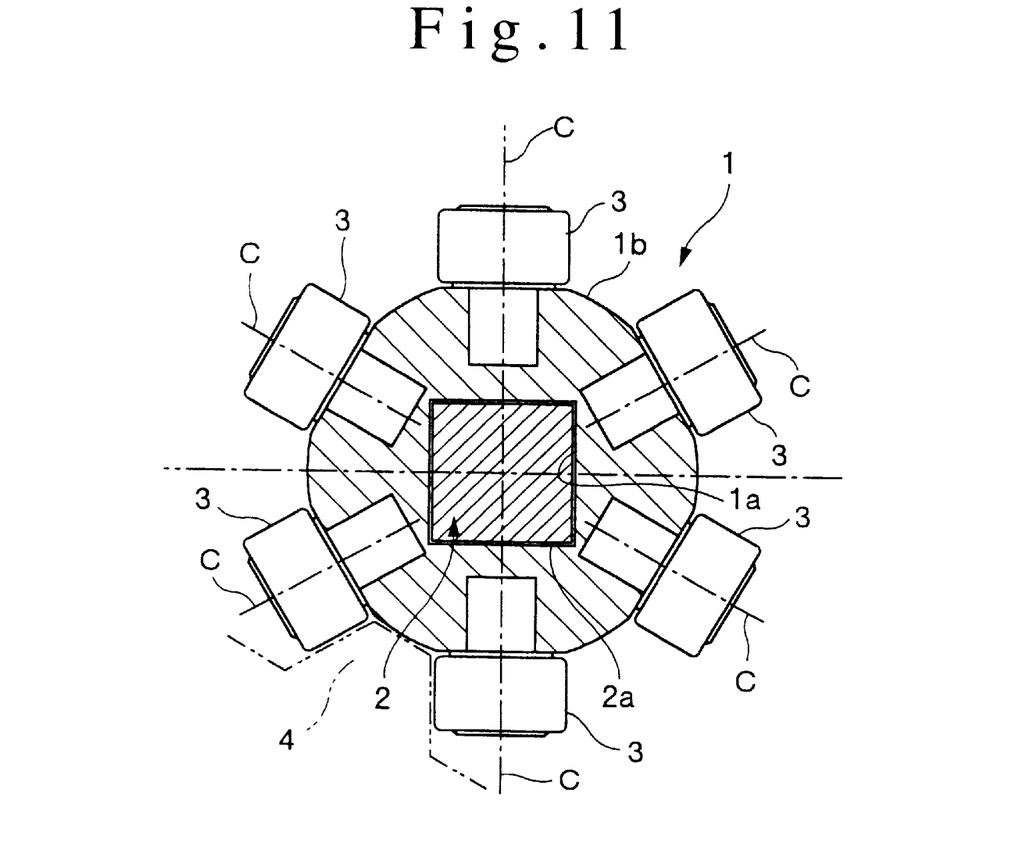
FIG. 11 is a cross sectional plan view of a turret used by a conventional cam-driven indexing mechanism.
Figure 12:
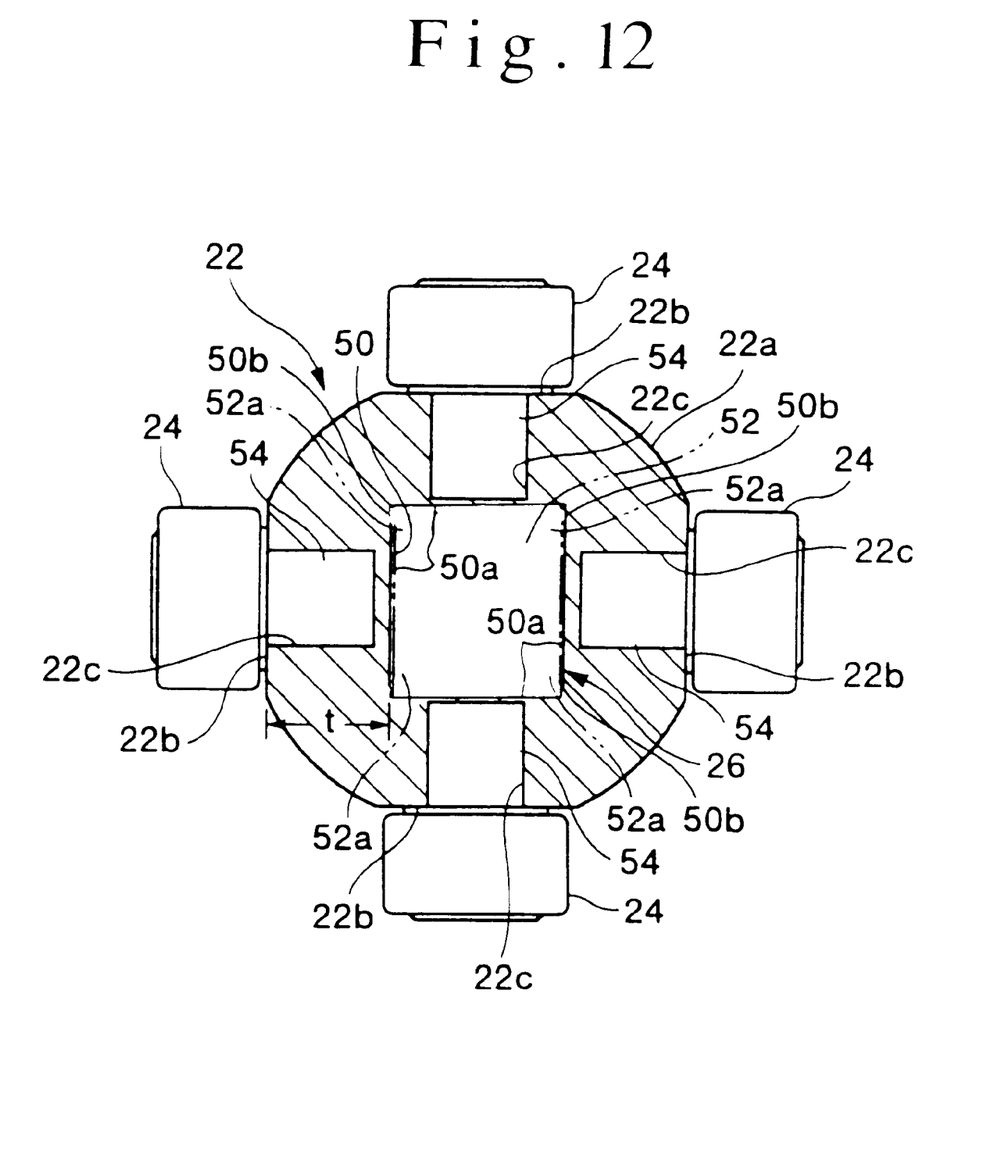
FIG. 12 is a cross sectional plan view showing a rectangular spline.

A conventional cam mechanism of the type delineated above incorporates a turret whose cross section is shown in FIG. 11. As turret 1 is connected to output shaft 2 by means of a sliding spline joint, spline shaft 2a of output shaft 2 is of a square cross section which approximately corresponds to the square cross section of spline orifice 1a in turret 1. Peripheral surface 1b of turret 1 is of a round shape in radial cross section, and has installed to it six roller type cam followers 3. Cam followers 3, which ride in the area defined between the aforesaid tapered ribs 4 on the periphery of the aforesaid roller gear cam, are disposed around the periphery of turret 1 at regular intervals with their rotational centerlines C radiating from the center of turret 1 and output shaft 2.

As a total of six cam followers 3 are disposed around the periphery of turret 1, their orientation in relation to rectangular spline orifice 1a results in varying amounts of material existing between each cam followers 3 and output shaft 2. In other words, the volume of material in turret 1 between cam followers 3 and output shaft 2 is greatest in the area at the center and opposite to the flat surfaces of spline orifice 1a, and smallest in the areas adjacent to the corners of spline orifice 1a. As all of the six cam followers 3 cannot be oriented directly opposite the planar surfaces of spline orifice 1a where the volume of material is greatest, some of the cam followers 3 must be positioned in a way which reduce the amount of material between the cam follower 3 and spline orifice 1a.

As a result of this configuration, turret 1 must be designed so as to provide adequate strength and rigidity around the cam followers 3 which are supported by the smallest volume of material in relation to the splined orifice 1a, and in doing so there is created a surplus of rigidity and strength in the area where the cam followers 3 are supported by the largest amount of material. The result is that the periphery of turret 1 is made to relatively large dimensions which, in turn, results in the problem of the entire cam mechanism being made to a larger size than is desirable.

SUMMARY OF THE INVENTION

This invention provides means by which the aforesaid cam followers can be disposed on the turret in the areas where there is maximum material between the cam follower and rectangular spline orifice, thus maintaining adequate turret rigidity and strength, and thus allowing the entire cam mechanism to be made to a smaller size.

In order to resolve the shortcomings mentioned above, the invention proposes a cam mechanism comprised of a roller gear cam solidly and fixedly attached to an input shaft, tapered ribs formed in a geometric curve pattern on the outer periphery of the roller gear cam, and a turret into whose center is formed a rectangular spline orifice. The turret is driven with an oscillating rotational movement by the rotation of roller gear cam through four cam followers which are located directly opposite and adjacent to the planar sides of the spline orifice formed in the turret center. The cam followers ride between the aforesaid tapered ribs on the roller gear cam periphery in a manner whereby the rotating movement of the roller gear cam is converted into an oscillating rotational movement of the turret.

Furthermore, the turret may be formed with the cam follower support pins as solid and integral components of the turret.

The geometrically curved tapered ribs on the roller gear cam periphery may be widened by increasing the width of the tapered rib in areas where it is desired to obtain more precise positioning movement for the aforesaid output shaft.

The invention further proposes a cam mechanism comprised of a roller gear cam solidly and fixedly attached to an input shaft, tapered ribs formed in a geometric curve pattern on the periphery of the roller gear cam, and a turret into whose center is formed a square spline orifice. The turret supports four cam followers located directly opposite and adjacent to the planar sides of the square spline orifice. These cam followers ride between the aforesaid tapered ribs on the roller gear cam periphery in a manner whereby the rotating movement of the roller gear cam is converted into an oscillating rotational movement of the turret. In this version the aforesaid turret is structured in a manner in which the pins supporting the cam followers are formed as a solid and integral part of the turret.

The invention further proposes a cam mechanism comprised of a roller gear cam solidly and fixedly attached to an input shaft, tapered ribs formed in a geometric curve pattern on the outer periphery of the roller gear cam, and a turret into whose center is formed a rectangular spline orifice. The turret supports four cam followers which are located directly opposite and adjacent to the planar sides of the rectangular spline orifice formed in the aforesaid turret, said four cam followers riding between the aforesaid tapered ribs on the roller gear cam periphery in a manner whereby the rotating movement of the roller gear cam is converted into a oscillating rotational movement of the turret. An output shaft is connected to the turret by means of a splined part which inserts into the spline orifice in the turret in a manner which allows free axial movement of the output shaft while it is rotatably held in its radial position supported by the turret. A reciprocating mechanism drives the output shaft with a linear reciprocating movement in the axial direction in synchronization with the output shaft's rotation on its radial axis. The spline in the turret is formed to a square cross section, and each cam follower on the turret's periphery is radially disposed directly facing one planar surface of the square spline orifice in the turret.

Moreover, the pins supporting the cam followers are formed as solid and integral components of the turret itself.

Furthermore, the turret's spline orifice may be formed to a square cross section, and the splined part of the output shaft may also be formed to the same square cross section as the spline orifice in the turret.

Moreover, the angular corners of the aforesaid spline orifice, which operate as the points at which drive torque is transmitted from the turret to the output shaft, are positioned at points as far as possible from the aforesaid cam followers.

Furthermore, the width of the geometrically curved tapered ribs on the roller gear cam periphery can be increased in specific areas and in specific lengths so as to narrow the adjacent channels which in turn can impart a more precise positioning action to the cam followers and thus to the output shaft.

The invention further proposes a cam mechanism comprised of a roller gear cam solidly and fixedly attached to an input shaft, geometrically curved tapered ribs formed on the outer periphery of said roller gear cam, and a turret into whose center is formed a square spline orifice. The turret supports four freely rotating cam followers by means of support pins which are located directly opposite and adjacent to the planar sides of the spline orifice in the aforesaid turret, and which ride between the aforesaid tapered ribs on the roller gear cam periphery in a manner whereby the rotating movement of the roller gear cam is converted into an oscillating rotational movement of the turret. A reciprocating drive mechanism drives the output shaft with a linear reciprocal movement in the axial direction while the output shaft remains fixed to the turret in the radial direction by means of the square spline part of the output shaft forming a joint with the square spline orifice in the turret. The aforesaid four cam follower support pins may be formed as solid and integral parts of the turret and disposed radially on the turret's periphery directly opposite and facing each planar side of the aforesaid square spline orifice. This arrangement positions the cam follower support pins a far distance from the angular corners of the spline orifice which transfer torque to the angular corners of the spline part of the output shaft.

The aforesaid structure provides means whereby the rotating movement of the input shaft on the roller gear cam is converted to an oscillating rotational movement of the turret through cam followers riding between the tapered ribs on the roller gear cam periphery.

The maximum volume of turret material is maintained between each cam follower and the output shaft as a result of positioning each cam follower on the periphery of the turret directly opposite and in the center of the each planar surface of the four-sided spline orifice. Because this configuration maintains the strength of each cam follower mounting area at the optimum level, the cam follower can be made larger, an advantage which acts to increase the strength of the cam follower itself while also extending the service life of the entire cam mechanism. Moreover, this design allows the turret itself to be made smaller, and therefore the size of the entire mechanism can also be reduced.

Furthermore, the cost of the cam mechanism is reduced due to the number of cam followers being decreased from the conventional six to four. Also, as each cam follower is positioned in the center of and directly opposite each side of the square spline orifice, it becomes easier to assemble the cam followers to the turret, and easier to fabricate the turret as a one-piece structure.

Moreover, the use of four cam followers increases the distance between each cam follower and the adjacent two cam followers, thus allowing the width of the aforesaid tapered ribs to be increased. The benefits of this point are numerous. Not only is the attachment of the cam follower to the turret strengthened as mentioned previously, but the strength of the mating surfaces where the cam follower contacts the tapered ribs is also significantly increased, a benefit which allows an overall smaller cam mechanism to withstand higher torque loads during its operation.

In addition, as the roller gear cam rotates in unison with the input shaft, the cam followers riding between the tapered ribs on the roller gear cam's periphery turn the turret with an oscillating rotational action, and thus the output shaft mounted in the turret's spline orifice also moves with an oscillating rotational action. Furthermore, the previously mentioned reciprocating mechanism drives the output shaft with a reciprocating movement in the axial direction simultaneously with the reciprocating rotational movement of the output shaft, a compound movement made possible by the sliding spline joint formed by the spline part of the output shaft connecting with the spline orifice in the turret.

Considering that torque from the turret is transferred to the angular corners of the spline part of the output shaft from the angular corners of the spline orifice in the turret, the strength of the turret in the area around the angular corners is increased because the cam followers are separated from the angular corners of the spline orifice by the farthest possible distance, thus allowing higher torque loads to be applied to a dimensionally smaller turret.

As the cam follower support pins can be formed as solid and integral components of the turret, the need to open bores on the turret periphery to accommodate separately assembled support pins is eliminated, thus also eliminating major stress points within the turret around the aforesaid bores. This configuration significantly strengthens the turret and allows both spline orifice and spline shaft to be enlarged with the result that the spline joint is able to withstand higher torque loads.

As mentioned previously, because the invention provides means whereby the tapered ribs on the periphery of the roller gear cam can be made wider (and therefore their adjacent channels narrower) at the area where a higher level of indexing positioning is desired, the area where the channel is narrowed applies a greater preload to the cam follower and therefore imparts a correspondingly higher level of indexing accuracy to the output shaft. Conversely, the preload on the cam followers is reduced at areas where the tapered ribs have not been widened, and thus has the effect of lengthening the service life of the cam mechanism. As a further benefit, heat discharge can be adequately controlled and energy losses minimized because only a very small amount of preload need be applied against the cam followers.

DESCRIPTION OF PREFERRED EMBODIMENTS

The preferred embodiments of the invention are directed to the invention as being applied as a tool changing mechanism for a metal processing machine.

Figure 2:
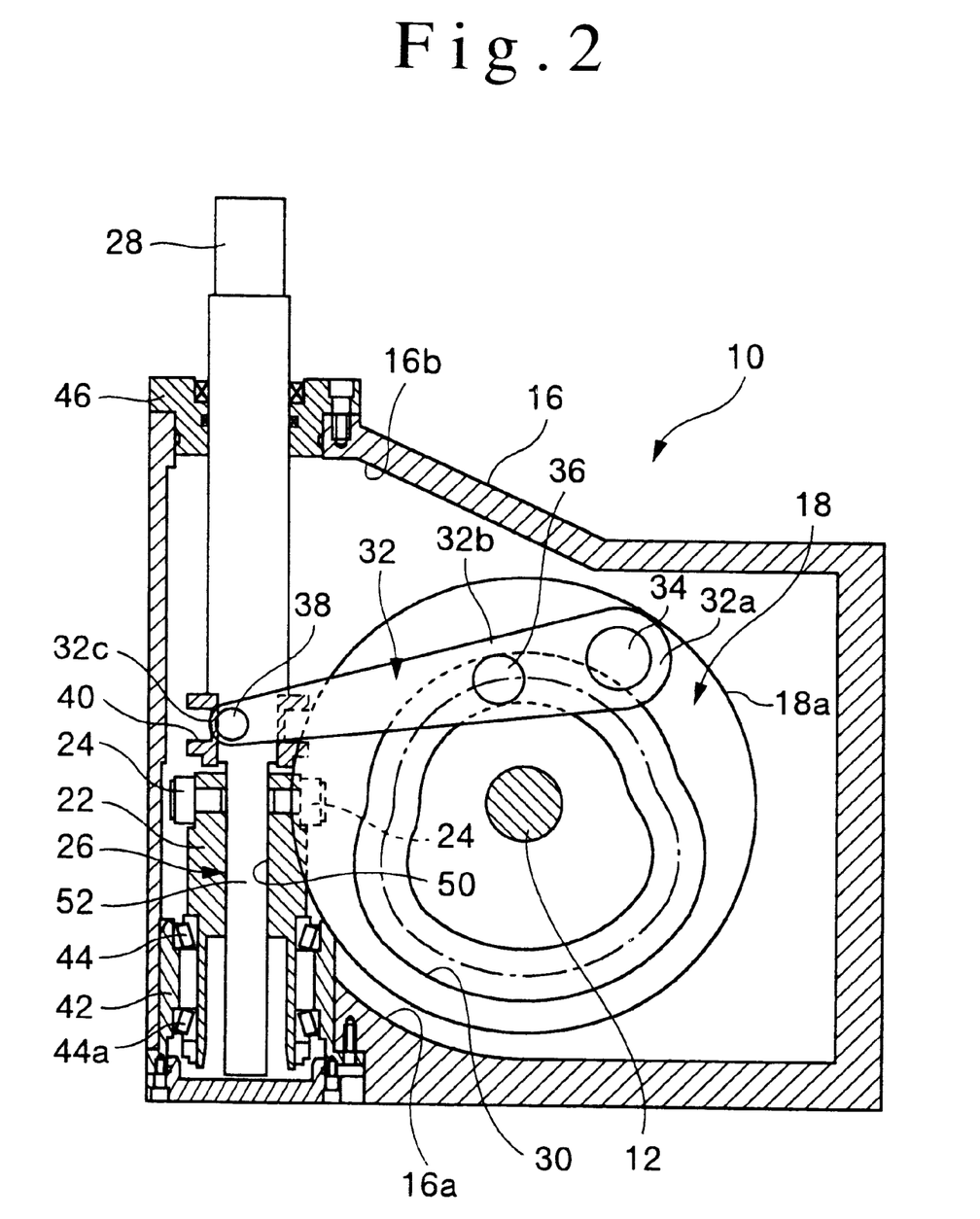
FIG. 2 is a cross sectional and internal front view of the invention.
Figure 3:
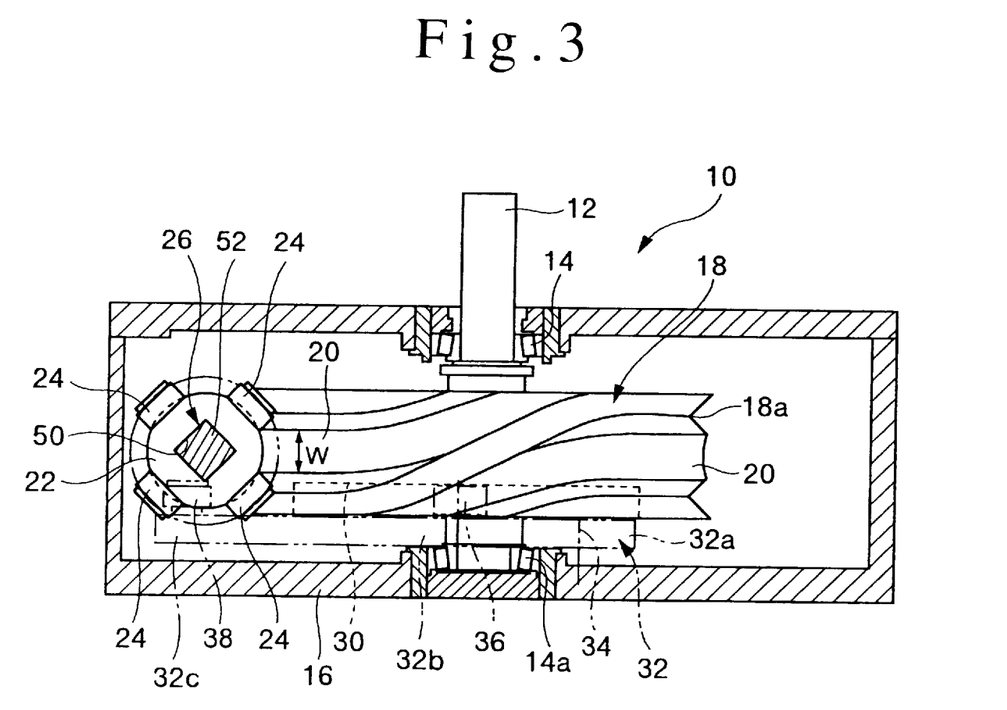
FIG. 3 is a cross sectional and internal plan view of the invention.
Figure 4:
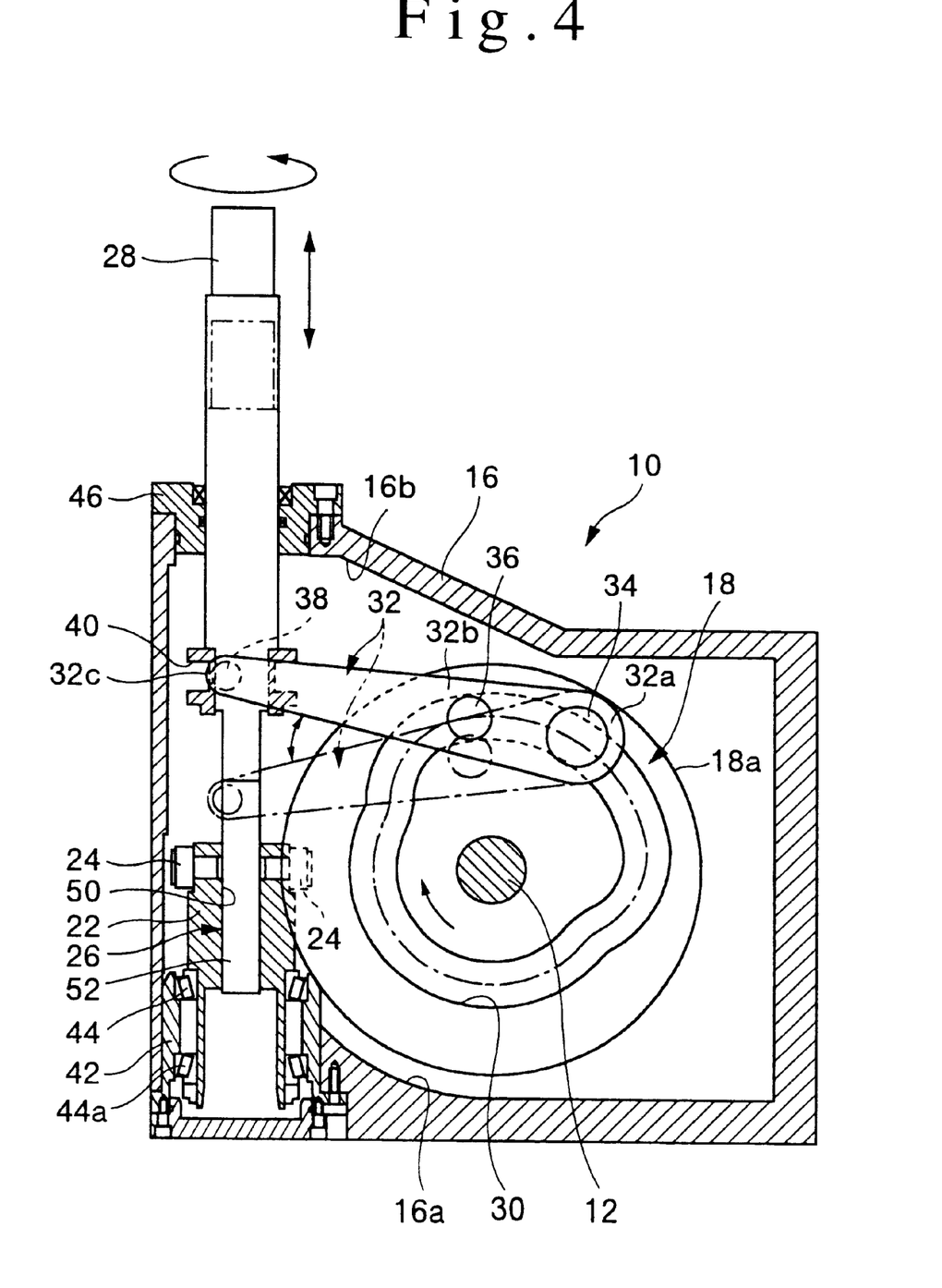
FIG. 4 is a cross sectional and internal front view of the invention showing two operating positions.

Rotational torque applied to input shaft 12 allows cam driven tool change mechanism 10, as shown in FIGS. 2 and 3, to provide the compound movement needed for a tool change cycle. Input shaft 12 is rotatably supported within housing 16 by means of roller bearings 14 and 14a, and is formed as a single integral structure together with roller gear cam 18.

Figure 6:
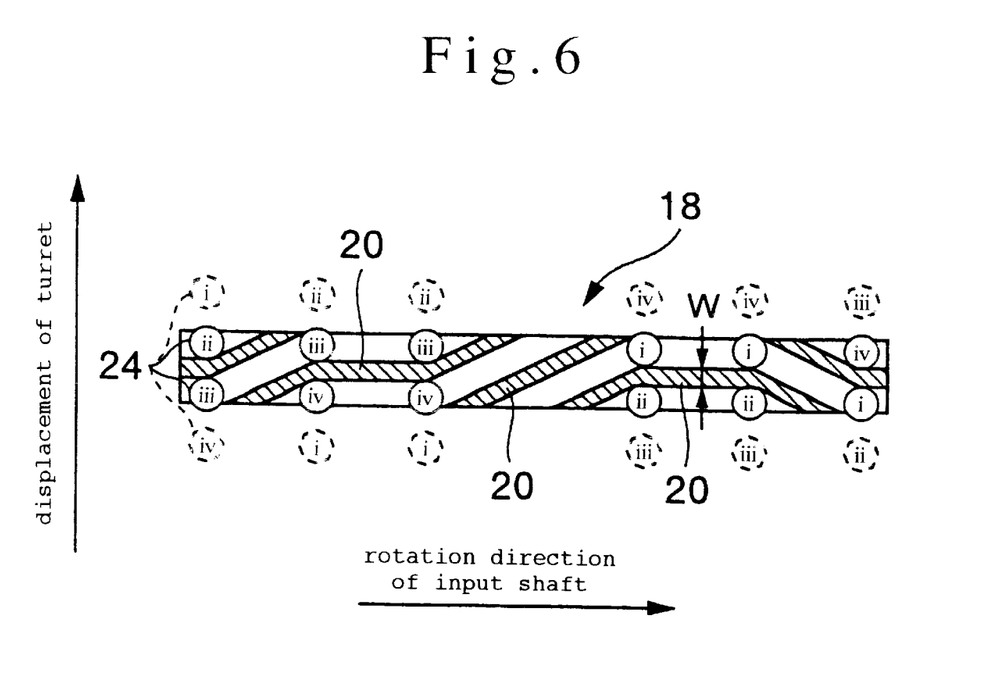
FIG. 6 is a diagram of the geometrically curved tapered ribs on the cam periphery of the invention.

As shown in FIG. 6, geometrically curved tapered ribs 20 are formed on the periphery of roller gear cam 18, these tapered ribs 20 being disposed so as to mesh with cam followers 24 on the periphery of turret 22. The rotational movement of roller gear cam 18 and the placement of tapered ribs 20 on the cam's periphery imparts an oscillating rotational movement to turret 22 through cam followers 24, thus also imparting an oscillating rotational movement to output shaft 28 which is installed to turret 22 by means of sliding spline joint 26. Components (i), (ii), (iii), and (iv) shown in FIG. 6 denote the cam followers 24 and their sequential disposition in relation to the tapered ribs 20 and the resulting oscillating rotational movement imparted to turret 22.

As shown in FIG. 2, cam channel 30 is formed in the lateral surface of roller gear cam 18 as a continuously varying geometric curve. Swing lever 32 is positioned over cam channel 30 with its right end 32a being rotatably supported by fixed pivot pin 34 which is solidly attached to housing 16. Cam follower pin 36 is attached to middle part 32b of swing lever 32 and also rides within cam channel 30.

Moreover, pin 38 is installed to left end 32c of swing arm 32 and rides within groove 40 which is located on the periphery of output shaft 28. When roller gear cam 18 rotates, cam channel 30 drives right end 32c of swing arm 32 with an upward and downward reciprocating movement by means of cam follower pin 32b, thus imparting a reciprocating movement to input shaft 28 in the axial direction by means of the connection between pin 38 and groove 40. Cam channel 30 and swing arm 32 comprise the main components of reciprocating mechanism 33.

Turret 22 is held within support cylinder 42 in a rotatable condition by means of bearings 44 and 44a which are positioned at the upper and lower ends of support cylinder 42. Support cylinder 42 is installed to lower surface 16a of housing 16. Output shaft 28, which is connected to turret 22 at sliding spline joint 26, is supported at its upper end by bearing 46. Bearing 46, installed to upper surface 16b of housing 16, allows output shaft 28 to move freely both in the axial and radial directions.

Figure 1:
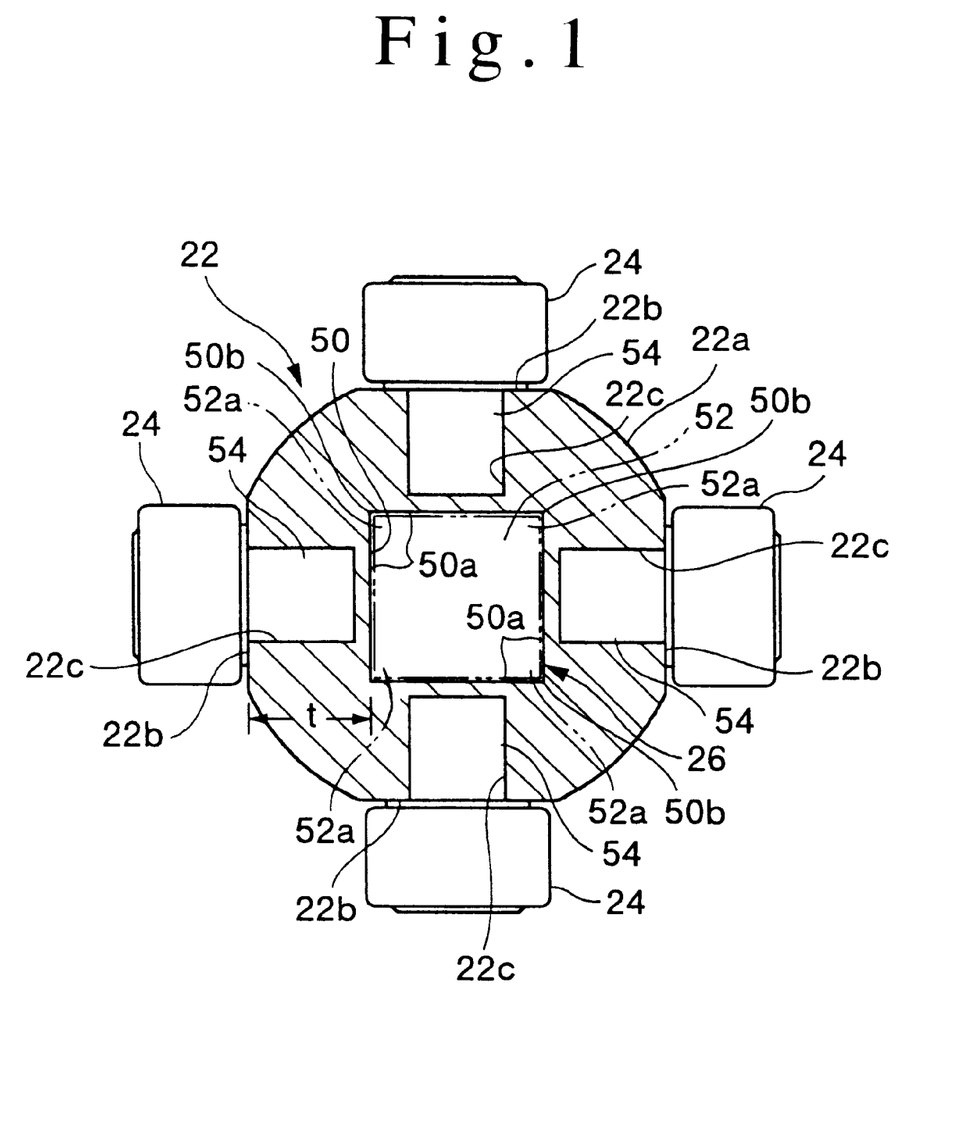
FIG. 1 is a cross section of one embodiment of the turret part of the invention.

As shown in FIG. 1, sliding spline joint 26 is comprised of spline orifice 50, located in the center of turret 22, and spline shaft 52 of output shaft 28. This joint 26 allows spline shaft 52 to move freely within turret 22 in the axial direction. The periphery of turret 22 is formed as an intermittently round cross section, and incorporates spline orifice 50 which is a square shape in cross section. Spline shaft 52 inserts into spline orifice 50 with sufficient clearance so that spline shaft 52 can move freely in the axial direction only.

Cam followers 24 are positioned at each flat surface 22b on the periphery of turret 22 in radial disposition whereby the lower surface of each cam follower 24 directly opposes each flat side 50a of square spline orifice 50, and are supported by cam follower support pins 54 which insert into cam follower attachment bores 22c which are in turn formed on each flat surface 22b.

Figure 5:
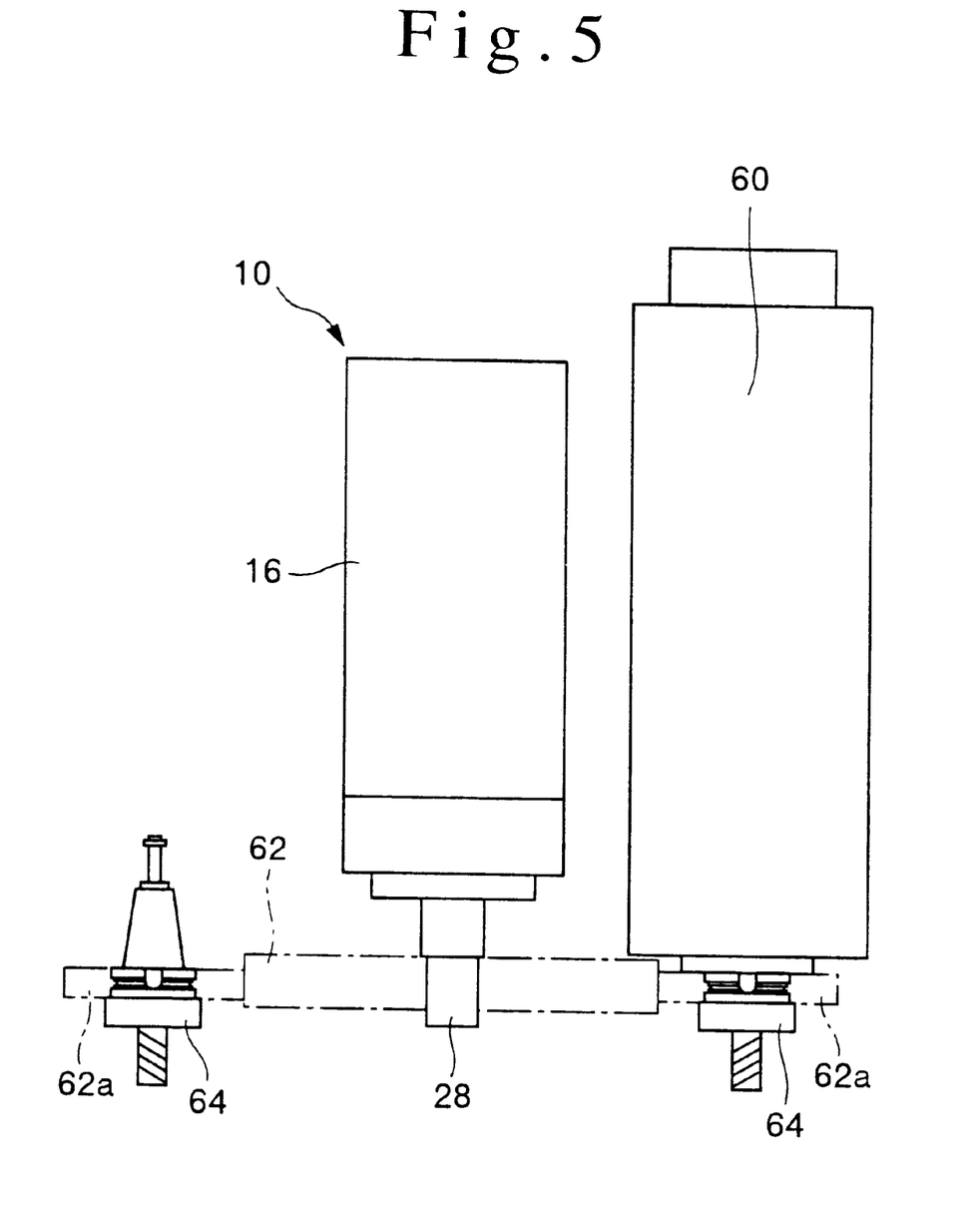
FIG. 5 is a diagram of the invention utilized as a tool changing mechanism.

As shown in FIG. 5, the tool change mechanism 10 is mounted in the vicinity of metal processing machine spindle 60 and tool carrier arm 62 is supported by output shaft 28. FIG. 5 shows the length of output shaft 28 as opposed to its radial cross section which is shown in FIG. 1. Tool support piece 62a is installed to each end of tool carrier arm 62, and mates with tool 64 when a tool change cycle is executed.

Figure 7:
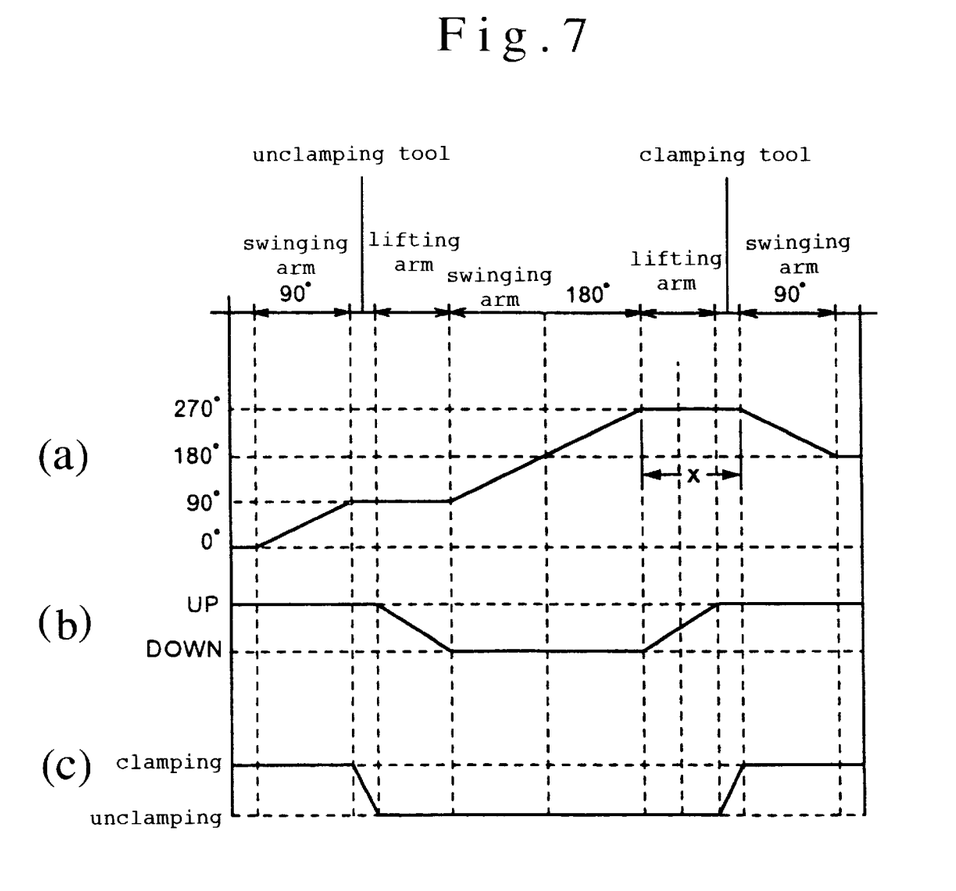
FIG. 7 is a line graph showing the relative timing of the rotating and axial positioning modes of the invention.

When this embodiment of the invention is utilized as tool change mechanism 10, rotating torque applied to input shaft 12 turns roller gear cam 18, thereby driving cam followers 24 through the rotating and simultaneous lateral movement of tapered ribs 20. Tapered ribs 20 are made to specific geometric curves which are designed to impart a timed oscillating rotational movement to turret 22 as shown by line "a" in the graph in FIG. 7. As turret 22 is connected to output shaft 28 through sliding spline joint 26, tool carrier arm 62 installed on the tip of output shaft 28 is also driven with an oscillating rotational movement.

At the same time, when roller gear cam 18 revolves, cam follower pin 36 rides within and follows cam channel 30, thus imparting an oscillating axial movement to swing arm 32. As pin 38 is both attached to end part 32c of swing arm 32 and inserted within the channel on collar 40 of output shaft 28, output shaft 28 is reciprocally driven in the axial direction as allowed by sliding spline joint 26 in turret 22. This movement is shown as line "b" in the graph in FIG. 7.

Because output shaft 28 rotates on its radial axis while simultaneously reciprocating in the axial direction, a compound tool change action can be imparted to both ends of tool carrier arm 62. In other words, as shown by line "c" in FIG. 7, timing can be established whereby the rotational movement of tool carrier arm 62 stops in synchronization with the clamp and unclamp operations applied to tool 64.

In regard to the structure of turret 22, as spline orifice 50 is formed with a square cross section, and as cam follower 24 faces directly opposite side and also in the center of surface 50a, the maximum amount of turret material (shown as "t") is used to support each cam follower 24 around spline orifice 50.

As a result of this design, the attachment area of cam follower 24 to turret 22 is strengthened, thus allowing cam follower 24 to be made larger, and thus increasing its strength, thereby extending the service life of tool change mechanism 10. Also, this design allows turret 22 itself to be made to smaller dimensions, thus allowing tool change mechanism 10 to be also made to smaller dimensions without any sacrifice in strength.

Moreover, as the number of cam followers 24 has been reduced from that used in the conventional mechanism, the cost of constructing tool change mechanism 10 is reduced. The positions of cam follower pins 24 in relation to spline orifice 50 also make it easier to assemble the turret 22.

Furthermore, the use of four cam followers 24 provides more space adjacent to each cam follower 24 and thus allows width "w" of tapered ribs 20 to be made to a wider dimension (see FIGS. 3 and 6). Also, the use of four cam followers 24 not only strengthens bore 22c into which cam follower support pin 54 is pressure inserted, but also strengthens the attachment of the cam follower 24 to the turret 22. This increase in strength can allow roller gear cam 18 to apply higher loads to turret 22, and thus in turn allow tool change mechanism 10 to be made to smaller dimensions while maintaining adequate torque handling capability.

When output shaft 28 is rotationally driven by turret 22, the result is that pressure is applied to angular corners 50b of spline orifice 50 as well as angular corners 52a of spline shaft 52. As cam followers 24 are attached to turret 22 at locations far from angular corners 50b of spline orifice 50, corners 50b are strengthened, thus allowing turret 22 to be made to smaller dimensions without sacrificing strength.

Figure 8:
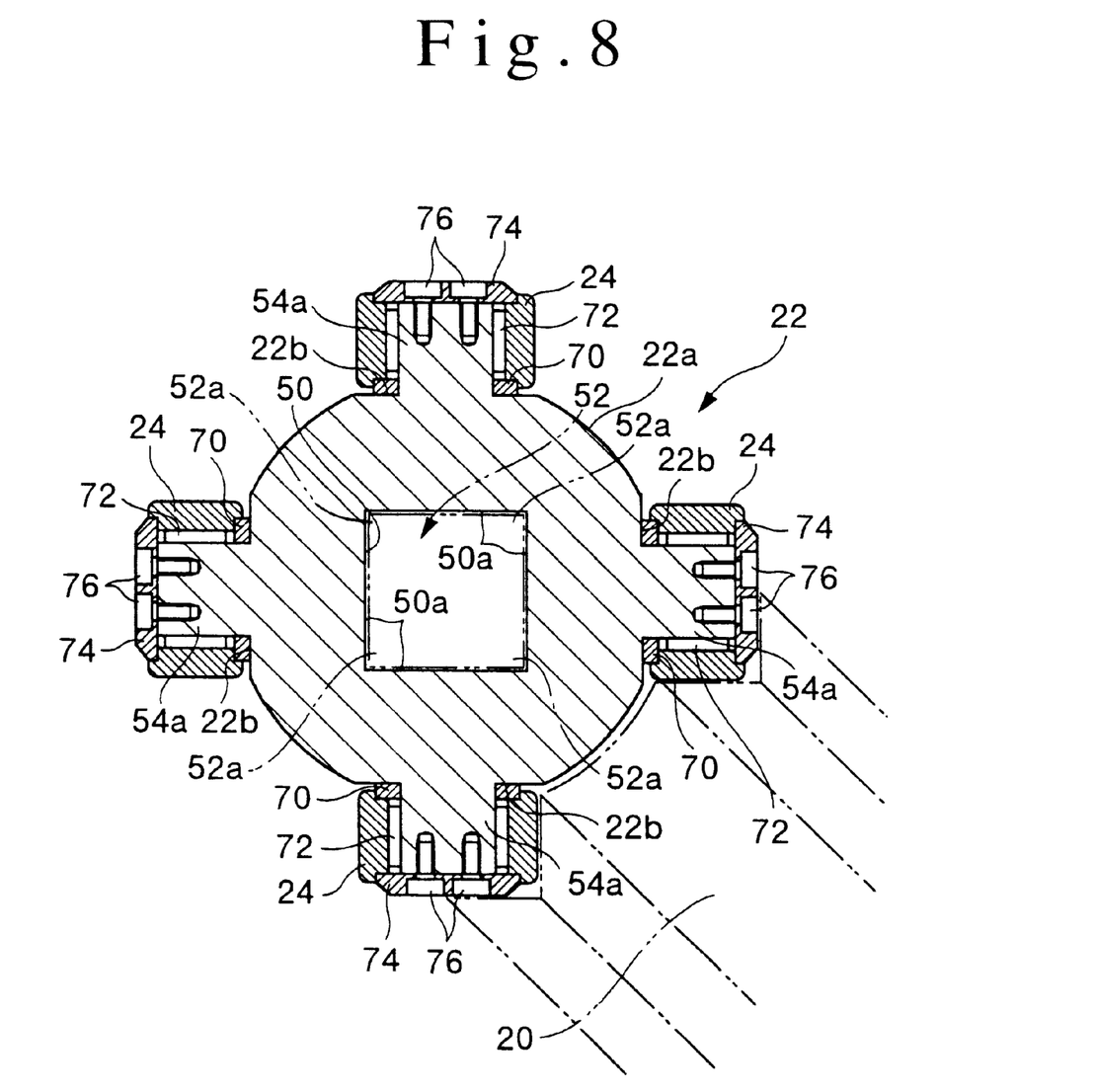
FIG. 8 is a cross sectional plan view of another embodiment of the turret part of the invention.

FIG. 8 depicts another embodiment of the invention in which four cam follower support pins 54a are formed at 90-degree angles on the periphery of turret 22 as solid and integral parts of turret 22.

Ring washer 70 is inserted over cam follower support pin 54a as a base for needle bearing unit 72, said needle bearing unit 72 being installed over and around support pin 54a. Cam follower 24 rides over needle bearing unit 72, and retainer plate 74 is installed to the end of support pin 54, by means of threaded fasteners, as means of securing cam follower 24.

As support pins 54a are formed as an integral part of turret 22 in this embodiment, the need to bore holes on the turret periphery to accommodate separate support pins is eliminated, thus also eliminating major stress accumulation points within the turret 22. This design has the effect of not only significantly strengthening turret 22, but also allows both spline orifice 50 and spline shaft 52 to be enlarged in order to withstand higher torque loads.

Figure 9:
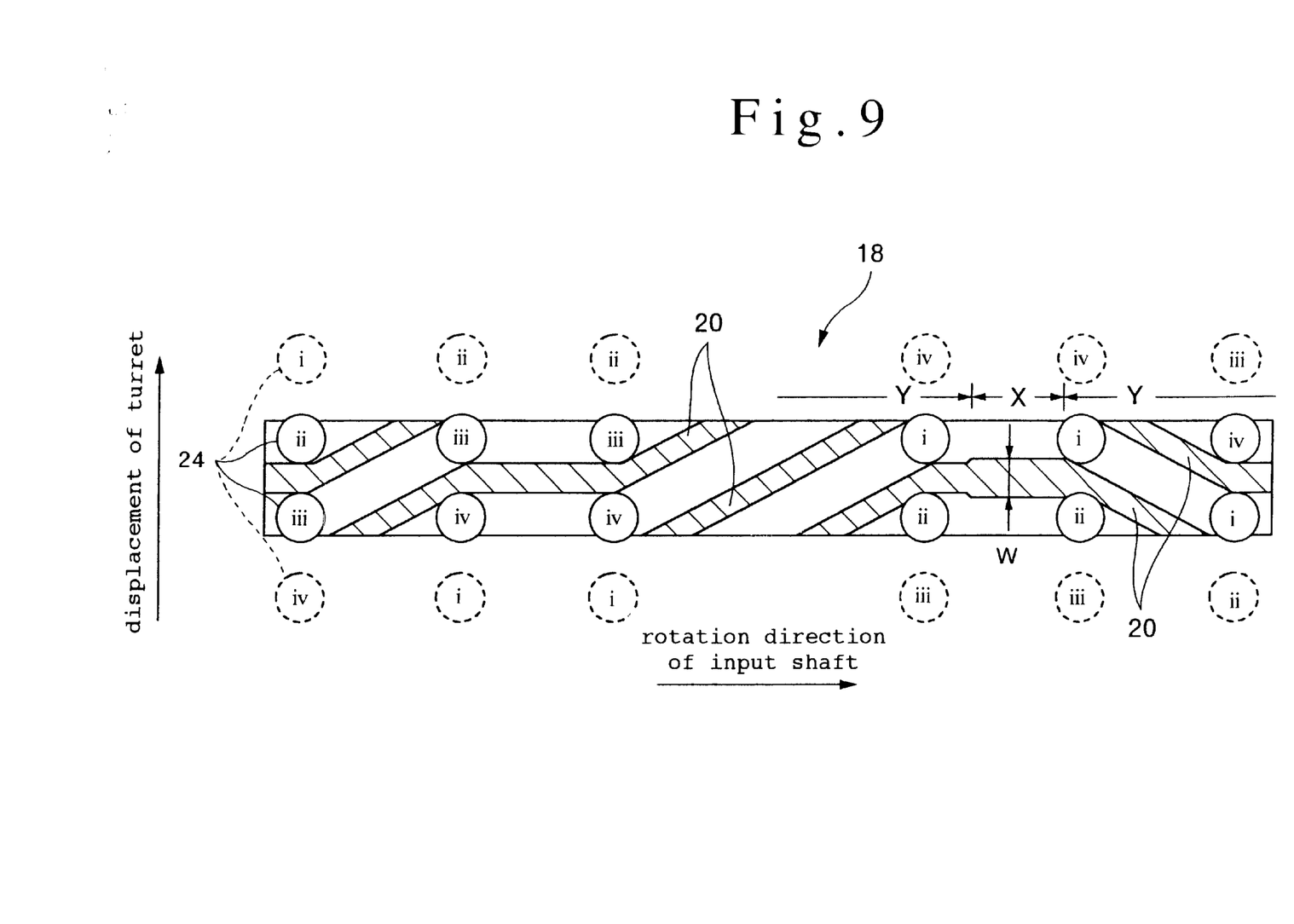
FIG. 9 is a diagram of the geometrically curved tapered ribs on the cam periphery of another embodiment of the invention.
Figure 10:
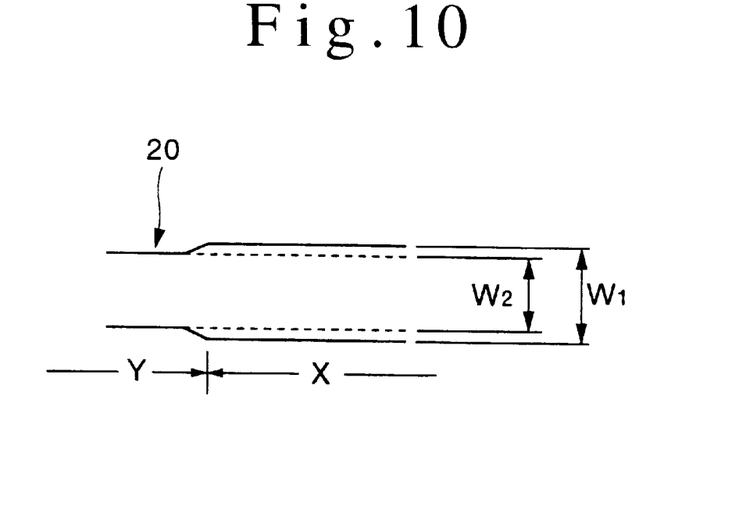
FIG. 10 is a enlarged drawing of a tapered rib used by the invention.

FIGS. 9 and 10 show a further embodiment of the invention in which thickness "W", said thickness being in the width direction of the tapered ribs 20 on periphery 18a of roller gear cam 18, is widened within the area along the cam periphery shown as X (zone X) with the purpose of increasing the precision of the indexing movement within zone X. Consequently, the width W1 of the tapered rib within zone X is larger than its width W2 in zone Y. For example, zone X can be established as the position at which a highly precise indexing action is desired for tool carrier arm 62, such as the position at which tool carrier arm 62 must be in perfect alignment with spindle 60 (FIG. 5), or in perfect alignment with a specific tool magazine position. (This position is shown as length "X" on line "a" in FIG. 7.) Therefore, cam follower 24 is able to ride between tapered ribs 20 with little or no preload in zone Y where the distance between the tapered ribs 20 is larger. Upon entering zone X, however, the narrower channel formed by the increases in the width of the tapered rib 20 will increase the preload against cam follower 24, and thus increase the precision of the indexing movement applied to output shaft 28.

Conversely, as cam follower 24 is subjected to less preload when riding between the tapered ribs 20 in zone Y, the service life of tool change mechanism 10 can be extended. Also, by placing a minimum preload on cam follower 24, thermal discharge can be better controlled and energy losses reduced.

The three embodiments discussed here make reference to the invention as applied to tool change mechanism 10. The invention, however, is not limited solely to this application, and may be further applied to any mechanisms making use of a cam-driven turret.

Because the invention provides means whereby the turret incorporates four cam followers installed on its periphery, each cam follower being positioned directly opposite each planar side of the rectangular spline orifice located in the center of the turret, the maximum amount of material can be maintained around the turret's spline orifice. Accordingly, the attachment strength of the cam follower to the turret can be significantly increased, the cam followers themselves can be made with greater strength, and the service life of the entire cam mechanism can be extended. Also, the turret can be made to smaller dimensions, thus allowing the entire mechanism to be made to a smaller size.

Moreover, as the number of cam followers is decreased as compared to the conventional mechanism, the cost of the cam mechanism can be lowered. Furthermore, the placement of the four cam followers directly opposite the planar sides of the spline orifice allows for easier assembly as well as easier fabrication of the turret as a one-piece assembly.

Furthermore, the use of only four cam followers increases the space adjacent to each cam follower, thus allowing the tapered ribs on the cam periphery to be made wider and stronger. Moreover, the use of only four cam followers not only allows a stronger joint to be formed between the turret and cam follower, but also forms a significantly stronger power transfer connection between the tapered ribs and turret, thus allowing higher operating loads to be placed on the turret which in turn allows the mechanism to be made smaller without sacrificing strength.

Moreover, considering that torque from the turret is transferred to the angular corners of the spline part of the output shaft from the angular corners of the spline orifice in the turret, the strength of the turret in the area around the angular corners can be increased due to the cam followers being separated from the angular corners of the spline orifice by the farthest possible distance, thus allowing the application of higher torque loads to a dimensionally smaller turret.

Furthermore, as the cam follower support pins can be formed as a solid and integral part of the turret, the need to bore holes on the turret periphery to accommodate separate support pins is eliminated, thus also eliminating major stress points within the turret around the bores. This configuration significantly strengthens the turret and allows both the spline orifice and spline part of the output shaft to be enlarged with a resulting increase in strength of the entire spline joint.

Moreover, the width of the geometrically curved tapered ribs on the periphery of the roller gear cam can be widened, and the adjacent channels correspondingly narrowed, along a specific length of the tapered rib where an especially precision indexing action is desired. A higher preload is applied to the cam follower when it enters the narrower channel, thus increasing indexing precision at the output shaft. Conversely, a lower preload is applied to the cam follower when it is riding in the wider channel adjacent to the area where the tapered rib is narrower, thus aiding in extending the service life of the mechanism. Because a minimum preload can be maintained along much of the roller gear cam's rotational traverse, thermal discharge can be controlled and energy losses reduced.

What is claimed is:

1. A cam mechanism comprised of a roller gear cam incorporating an integrally rotated input shaft and geometrically curved tapered ribs formed on the cam's peripheral circumference, and a turret part having a spline orifice formed in its center and cam followers attached to its periphery, said cam followers riding between said tapered ribs in a manner as to impart an oscillating rotational movement to said turret; wherein said spline orifice is formed to rectangular cross section and said cam followers are radially disposed around said spline orifice directly opposite to each planar surface of said rectangular spline orifice so as to keep said cam followers away from torque transmitting angular corners of said rectangular spline orifice and so as to provide the greatest volume of material of the turret between said cam followers and said rectangular spline orifice.

2. A cam mechanism as set forth in claim 1, wherein pins on which said cam followers are rotatably attached are formed as an integral component of said turret part.

3. A cam mechanism as set forth in claim 1, wherein said geometrically curved tapered ribs are formed to a wider cross section at the areas of the cam periphery where a more precise indexing action of said output shaft is desired, and to a narrower cross section at other areas of the cam periphery.

4. A cam mechanism comprised of a roller gear cam incorporating an integrally rotated input shaft and geometrically curved tapered ribs on the cam's peripheral circumference, and a turret part having a spline orifice formed in its center and cam followers attached to its periphery, said cam followers riding between said tapered ribs in a manner as to impart an oscillating rotational movement to said turret from the rotation of said roller gear cam; wherein said spline orifice is formed to a square cross section, and four cam follower support pins are formed as integral components of said turret, each of said support pins being radially disposed around said spline orifice directly opposite to each planar surface of said spline orifice, and further holding and supporting a cam follower in a rotatable condition so as to keep said cam followers away from torque transmitting angular corners of said square spline orifice and so as to provide the greatest volume of material of the turret between said cam followers and said square spline orifice.

5. A cam mechanism comprised of a roller gear cam incorporating an integrally rotated input shaft and geometrically curved tapered ribs formed on the cam's peripheral circumference, a turret part having a spline orifice formed in its center and cam followers attached to its periphery, said cam followers riding between said tapered ribs in a manner as to impart an oscillating rotational movement to said turret from the rotation of said roller gear cam, an output shaft joined to said spline orifice by means of a sliding spline joint which allows free linear movement of said output shaft in the axial direction as well as rotational movement on the radial axis together with said turret part, and a reciprocating mechanism which imparts a linear reciprocating movement to said output shaft in the axial direction in synchronization with rotational movement input from said input shaft; wherein said spline orifice is formed to a rectangular cross section and said cam followers are radially disposed on the turret's periphery directly opposite to each planar surface of said spline orifice so as to keep said cam followers away from the torque transmitting angular corners of said rectangular spline orifice and so as to provide the greatest volume of material of the turret between said cam followers and said rectangular spline orifice.

6. A cam mechanism as set forth in claim 5, wherein pins to which said cam followers are rotatably attached are formed as solid and integral components of said turret part.

7. A cam mechanism as set forth in claim 5, wherein said spline orifice is formed to a square cross section, and wherein the spline part of said output shaft is formed to a corresponding square cross section.

8. A cam mechanism as set forth in claim 5, wherein attachment positions of said cam followers are established at points far from the angular corners of said spline orifice, said angular corners operating in a manner as to apply torque to the angular corners of said spline part of said output shaft.

9. A cam mechanism as set forth in claim 5, wherein the width of said tapered ribs increases at areas on said cam periphery where it is desired to obtain increased precision in regard to the positioning movement imparted to said output shaft.

10. A cam mechanism comprised of a roller gear cam incorporating an integrally rotated input shaft and geometrically curved tapered ribs formed on the cam's peripheral circumference, a turret part having a spline orifice formed in its center and cam followers attached to its periphery, said cam followers riding between said tapered ribs in a manner as to impart an oscillating rotational movement to said turret from the rotation of said roller gear cam, an output shaft joined to said spline orifice by means of a sliding spline joint which allows free linear movement of said output shaft in the axial direction as well as rotational movement on the radial axis together with said turret part, and a reciprocating mechanism which imparts a linear reciprocating movement to said output shaft in the axial direction in synchronization with rotational movement input from said input shaft; wherein the spline part of said output shaft is made to a square cross section corresponding to a square spline orifice formed in said turret part; and whereby cam follower support pins are radially disposed directly opposite to each planar surface of said spline orifice, formed as integral components of said turret, support said cam followers in a rotatable condition, and are positioned at locations farthest from angular corners of said spline orifice where torque is transferred to the angular corners of said spline part of said output shaft so as to keep said cam followers away from the torque transmitting angular corners of said square spline orifice and so as to provide the greatest volume of material of the turret between said cam followers and said square spline orifice.

* * * * *